Dec. 18, 1945.   T. A B. LEGOWIK   2,391,250
COMPOSITE BEAM
Filed Aug. 18, 1944
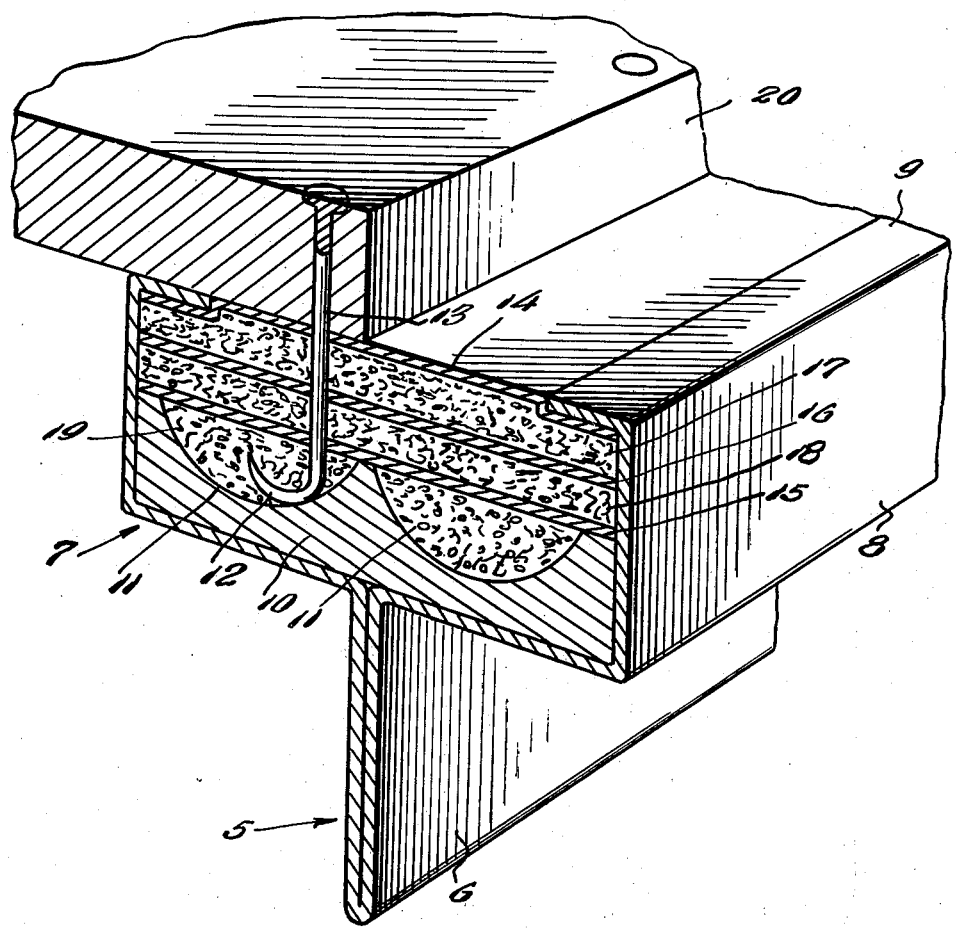
Inventor
Thaddeus A. B. Legowik
By Clarence A. O'Brien
and Harvey B. Jacobson
Attorneys Patented Dec. 18, 1945

2,391,250

UNITED STATES PATENT OFFICE 2,391,250

COMPOSITE BEAM

Thaddeus A. B. Legowik, Great Falls, Mont.

Application August 18, 1944, Serial No. 550,084

4 Claims. (Cl. 189—37)

This invention relates to a structural device or part usable in buildings and equivalent structures such as may be conveniently and unitarily referred to as a composite beam, the same having reference to an all-metal multiple element assemblage which is so fashioned and designed as to permit wooden and equivalent parts to be conveniently and adequately secured thereto by nails, screws and equivalent fasteners.

The purpose of the invention is to provide an all-purpose or universal beam-like unit of general T-shaped cross-sectional form, the so-called head portion thereof being of box-like form and charged with a laminated or equivalent core structure, the latter being so made as to expedite and insure appropriate anchorage of nails from the wooden boards or other parts attachable to the head of the beam.

More explicitly, I have evolved and produced a simple and expedient stringer or beam of the aforementioned T-shaped type, the principal novelty having to do with the box-like hollow head and the core filler embodied therein.

In carrying out the principles of the invention I have perfected a structural part which lends itself to various requirements of the trade, the same being susceptible of manufacture from light weight metals or suitably stabilized plastics, but being preferably an all-metal sectional device to more effectively achieve the ends sought.

Other features and advantages will become more readily apparent from the following description and the accompanying illustrative drawing.

In the drawing, the single figure is a perspective view of the composite stringer or beam constructed in accordance with the principles of this invention and showing the manner in which a board, plank, plate or the like is nailed securely in place.

Referring now to the drawing by distinguishing reference numerals it will be observed that the device, as a structural unit, is denoted by the numeral 5 and constitutes a so-called "beam." As before stated, it is of T-shaped construction in cross-sectional form and, therefore, characterized by a central longitudinal double-ply flange 6 and a head 7. Actually the shell portion of the beam is made from fairly light weight sheet metal which is bent upon itself between its ends to form a double-ply flange 6 and a rectangular box-like enclosure 7. Incidentally, the part 7 described as a "head" includes all of the elements plus the hollow metal part which is the box and may be either the enclosure or casing whichever best describes the same. The parallel side walls 8 terminate in short inturned flanges 9 as shown. An important phase is a metal insert or block 10 having longitudinal channels 11 whose surfaces constitute bending anvils or surfaces for defining a return bend or "clench" 12 on the nails 13. That part of the core above the anvil block 11 may be described as a laminated "sandwich." It comprises upper and lower malleable or soft metal plates 14 and 15 and an intervening corresponding plate 16, these being disposed in spaced parallelism. The spaces between are charged with appropriate fillers 17 and 18. The pockets formed in the channels 11 are also charged with similar filler materials 19.

The various fillers may be varying textures and materials such as impregnated paper, rope, metal screens, metal shreds or any materials found suitable for proper results and actual working conditions.

The choice of fillers may be determined by climatic conditions varying in different localities. It is evident too, that the component parts of the head and core are assembled under sufficient compression so that when the flanges 9 are crimped and the edge portions of the plates 14 are bent securely therebeneath as shown in the drawing, the unitary assemblage is packed to offer proper retention characteristics and to withstand stresses and strains imposed by different types of fasteners. Many types of fasteners may be used such as nails of an ordinary type, split nails, screws or special types of screws and fasteners. The part 20 to be anchored on the beam 5 may be of wood or any other structural material as is called for in the trade.

This structural member may be designed so as to increase strength of ordinary frame buildings and yet decrease weight. It is vermin and insect resistant. Such pests as termites and woodborers would not be able to damage buildings using these members and other materials as resistants.

This idea may be applied to members of all sizes so that it may be utilized in any part of a building that would call for a surface that would be attached to the structural member by means of drive fasteners of any suitable type.

By varying the composition of the various components of this structural member, it can be tailored to cope with any and all climates, soil conditions, or vermin, insects or pests that may be encountered.

By using multiples on a face of a large structural member, the utility may be increased. By applying this idea to aircraft beams, various upholstery may be attached direct to structural members of a fuselage by means of staples. This idea may be applied to motor cars, busses, railroad vehicles and allied structures where facing parts are applied to basic material to provide comfort and safety to the public.

Homes built of such structural members would not warp with humidity or dry weather. Floors attached to such members would not warp with humidity.

Lightweight metal furniture could be built incorporating this idea and the upholstery would be attached directly to the framework.

Pipe and wiring could be attached to such structural members with staples, nails or other drive fasteners very rapidly.

This type of structural member may be embedded partially in concrete and not warp because of moisture, giving a foundation or base to nail to or otherwise attach floor and wall members by means of drive fasteners of suitable characteristics. No drilling or riveting is required or necessary.

Although the so-called "beam" is shown as a T-shaped cross section, it is obvious that it can be of other cross sectional configurations such as are found in I-beam, U-beams and so on. Also, it is immaterial whether the body in made up of a single bent plate or a plurality of plates.

It is thought that persons skilled in the art to which the invention relates will be able to obtain a clear understanding of the invention after considering the description in connection with the drawing. Therefore, a more lengthy description is regarded as unnecessary.

Minor changes in the shape, size and arrangement of details coming within the field of invention claimed may be resorted to in actual practice, if desired.

I claim:

1. A composite beam for building in construction work comprising a T-shaped part fashioned from a single plate of light weight metal bent between its ends to define a central longitudinally extending flange forming a rib, and a hollow box-like head, the upper edges of the side walls of said head being inturned to provide assembling flanges, and a core embodied in said head, said core being of laminated form, the laminations being made up of alternate soft metal plates and intervening packed fillers.

2. A composite construction and building beam of the class described comprising a foundation part formed of sheet metal and including a central longitudinal rib, and a hollow head formed thereon, said head being of box-like hollow construction and including parallel upstanding flanges and inturned top flanges, a solid metal plate embodied in said head and having longitudinally extending channels, and a laminated structure thereabove comprising a plurality of superposed vertically spaced soft metal plates and intervening fillers between said plates.

3. A composite beam for building and construction work comprising a main T-shaped part fashioned from a single plate of light weight metal bent between its longitudinal edges to define a single unit characterized by a central longitudinally extending flange forming a rib and an attending hollow box-like head, the upper edges of the side walls of said head being inturned to provide assembling flanges, a core embodied in said head, said core being of laminated form, the laminations being in the form of alternate soft metal plates and intervening packed fillers, and said core embodying, in addition, an anvil forming plate, the latter being constructed to deflect and clench nails.

4. A composite beam for use in building and construction work comprising a body including a central longitudinal rib and a hollow head, said head being of substantially box-like form and including spaced parallel upstanding flanges having inturned and opposed top flanges, an anvil-forming plate embodied in said head and having a channeled surface fashioned to facilitate deflecting and clenching nails, and a laminated core structure also in said head coacting with said plate and held in position by said inturned flanges, said core structure being composed of a plurality of laminations including plates and fillers between the plates.

THADDEUS A. B. LEGOWIK.